US012777002B2

(12) United States Patent
Xing et al.

(10) Patent No.: US 12,777,002 B2
(45) Date of Patent: Oct. 27, 2026

(54) PACKET PROCESSING METHOD AND NETWORK DEVICE

(71) Applicant: REALTEK SEMICONDUCTOR CORPORATION, Hsinchu (TW)

(72) Inventors: Hao-Chen Xing, Suzhou (CN); Tao Cui, Suzhou (CN); Feng-Lin Wang, Suzhou (CN); Ming-Xu Wang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 279 days.

(21) Appl. No.: 18/770,707

(22) Filed: Jul. 12, 2024

(65) Prior Publication Data

US 2025/0030650 A1 Jan. 23, 2025

(30) Foreign Application Priority Data

Jul. 18, 2023 (CN) ......................... 202310882418.9

(51) Int. Cl.
*H04L 49/90* (2022.01)
*H04L 49/9047* (2022.01)

(52) U.S. Cl.
CPC ...... *H04L 49/9068* (2013.01); *H04L 49/9047* (2013.01); *H04L 49/9084* (2013.01)

(58) Field of Classification Search
CPC ............. H04L 49/9068; H04L 49/9047; H04L 49/9084; H04L 49/354; H04L 49/9042
See application file for complete search history.

(56) References Cited

U.S. PATENT DOCUMENTS

2006/0101470 A1* 5/2006 Swanberg ............. G06F 9/5077 718/105
2015/0049771 A1* 2/2015 Konriki ............... H04L 49/9005 370/417

* cited by examiner

*Primary Examiner* — Ayanah S George
(74) *Attorney, Agent, or Firm* — WPAT, PC

(57) ABSTRACT

A packet processing method includes: allocating a portion of storage space in a memory circuit as a storage pool including first storage blocks; storing a packet in one of the first storage blocks when a data size of the packet is less than or equal to a predetermined value, and releasing the one of the first storage blocks to the storage pool after the packet is processed; requesting an increase in a number of the first storage blocks from a kernel when a number of remaining storage blocks in the first storage blocks that do not store data is less than a threshold value; and requesting second storage block from the kernel to increase a data capacity of the storage pool to store the packet when the data size is greater than the predetermined value, and releasing the second storage block to the kernel after the packet is processed.

20 Claims, 7 Drawing Sheets

500

PACKET PROCESSING METHOD AND NETWORK DEVICE

BACKGROUND OF THE DISCLOSURE

1. Field of the Disclosure

The present disclosure relates to a packet processing method. More particularly, the present disclosure relates to a packet processing method and a network device that have multiple packet processing methods and a memory management.

2. Description of Related Art

Network interface controller (NIC) circuits are commonly utilized in various network devices for transmitting and processing packets. In some related approaches, the network interface controller circuit uses only a single packet processing method. However, in certain situations (for example, when the packet to be processed has a large data size, when the packets to be processed have a small data size, or when the number of packets to be processed is not large), the operation time taken by this packet processing method could be too long, significantly reducing system operational efficiency. On the other hand, when processing packets, the network interface controller circuit needs to request memory space from the system kernel to store the packets and release the previously used memory space after the packet processing is completed. If the number of packets to be processed is large, the frequent operations of requesting and releasing memory space could also decrease system operational efficiency.

SUMMARY OF THE DISCLOSURE

In some aspects of the present disclosure, an object of the present disclosure is, but not limited to, provide a packet processing method and a network device that have multiple packet processing methods and a memory management, so as to make an improvement to the prior art.

In some aspects of the present disclosure, a packet processing method includes following operations: allocating a portion of storage space in a memory circuit as a storage pool, in which the storage pool comprise a plurality of first storage blocks; storing a packet in one of the plurality of first storage blocks when a data size of the packet is less than or equal to a predetermined value, and releasing the one of the plurality of the first storage blocks to the storage pool after the packet is processed; requesting an increase in a number of the plurality of first storage blocks from a kernel when a number of remaining storage blocks in the plurality of first storage blocks that do not store data is less than a threshold value; and requesting at least one second storage block from the kernel to increase a data capacity of the storage pool to store the packet when the data size of the packet is greater than the predetermined value, and releasing the at least one second storage block to the kernel after the packet is processed.

In some aspects of the present disclosure, a network device includes a network interface controller circuit, a central processing unit circuit, and a memory circuit. The network interface controller is circuit configured to receive a packet. The central processing unit circuit is configured to execute a kernel and a network interface controller driver. The memory circuit is electrically coupled to the central processing unit circuit. A portion of storage space of the memory circuit is allocated as a storage pool that includes a plurality of first storage blocks, and the storage pool is configured to request an increase in a number of the plurality of first storage blocks from the kernel when a number of remaining storage blocks in the plurality of first storage blocks that do not store data is less than a threshold value. The network interface controller driver is configured to store the packet in one of the plurality of first storage blocks when a data size of the packet is less than or equal to a predetermined value, release the one of the plurality of the first storage blocks to the storage pool after the packet is processed, request at least one second storage block from the kernel to increase a data capacity of the storage pool to store the packet when the data size of the packet is greater than the predetermined value, and release the at least one second storage block to the kernel after the packet is processed.

These and other objectives of the present disclosure will no doubt become obvious to those of ordinary skill in the art after reading the following detailed description of the preferred embodiments that are illustrated in the various figures and drawings

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may be a single system formed with at least one circuit, and the term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
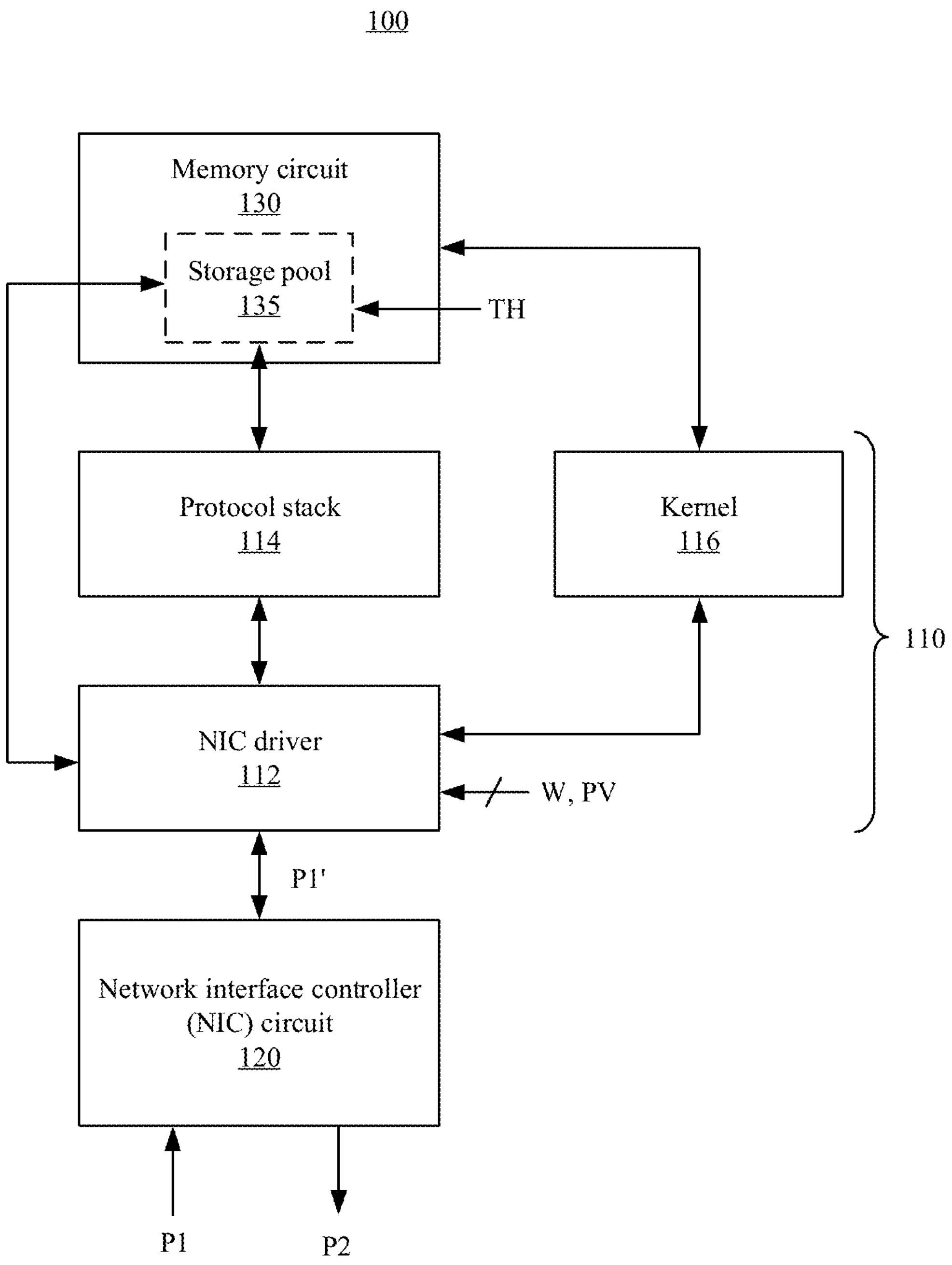
FIG. 1 illustrates a schematic diagram of a display system according to some embodiments of the present disclosure.

FIG. 1 illustrates a schematic diagram of a network device 100 according to some embodiments of the present disclosure. In some embodiments, the network device 100 may be, but is not limited to, switches, routers, wireless access points, and other network equipment.

The network device 100 includes a central processing unit (CPU) circuit 110, a network interface controller (NIC) circuit 120, and a memory circuit 130, where the CPU circuit 110 may be configured to execute a NIC driver 112, a protocol stack 114, and a kernel 116. In some embodiments, the NIC driver 112 may be a driver program executed by the CPU circuit 110, which may be configured to set up or control the NIC circuit 120 to process the received packet P1. In some embodiments, the protocol stack 114 may be a software implementation of computer network protocols, which may be configured to interact with the NIC circuit 120 and the kernel 116 to process the received packet P1. In some embodiments, the kernel 116 may be, but is not limited to, a computer program in the operating system that is configured to manage the data transmission requests of various hardware components.

In some embodiments, the NIC circuit 120 may also be referred to as a network interface card. In some embodiments, the NIC circuit 120 may be a circuitry that implements a specific network standard (such as Ethernet, local area network, etc.), which may allow the network device 100 to interact with other devices on the network. The NIC circuit 120 may transmit or receive packet(s) through the network. In a general mode, under the control of the NIC driver 112, the NIC circuit 120 may transmit the received packet P1 to the protocol stack 114 for parsing. Alternatively, in the general mode, the protocol stack 114 may send a packet P2 to be transmitted through the NIC circuit 120 to other devices (not shown). In some embodiments, when the NIC circuit 120 operate in a loopback mode, the NIC driver 112 may release the received packet P1 (labeled as the packet P1') back to the NIC circuit 120. Thus, the NIC circuit 120 may determine whether the packet P1 and P1' are the same, thereby checking whether the connection between the network device 100 and another device that sent the packet P1 is correct.

In some embodiments, the NIC driver 112 may selectively utilize the interrupt function or the poll function to process the packet P1 based on the amount of data in the packet P1. Thus, the appropriate packet processing method may be employed based on the actual amount of data in the received packet P1, in order to improve the efficiency of packet processing. Operations regarding herein will be given later with reference to FIG. 2. In some embodiments, the aforementioned interrupt function may be, but is not limited to, an interrupt request (IRQ) of the Linux system. In some embodiments, the aforementioned poll function may be, but is not limited to, the poll function of the Linux system.

The memory circuit 130 is electrically coupled to the CPU circuit 110. In some embodiments, the memory circuit 130 is mainly managed by the kernel 116. In some embodiments, the memory circuit 130 may be configured to store various data, and a portion of the storage space of the memory circuit 130 is configured as a storage pool 135. In some embodiments, storage blocks in the storage pool 135 (i.e., different storage spaces in the memory circuit 130) may be configured to store transient data generated during the process of processing the packet P1. In some embodiments, the NIC driver 112 may adjust the settings of the storage blocks in the storage pool 135 to improve the efficiency of sending and receiving packets. Operations regarding herein will be described later with reference to FIGS. 3A to 3C.

Figure 2:
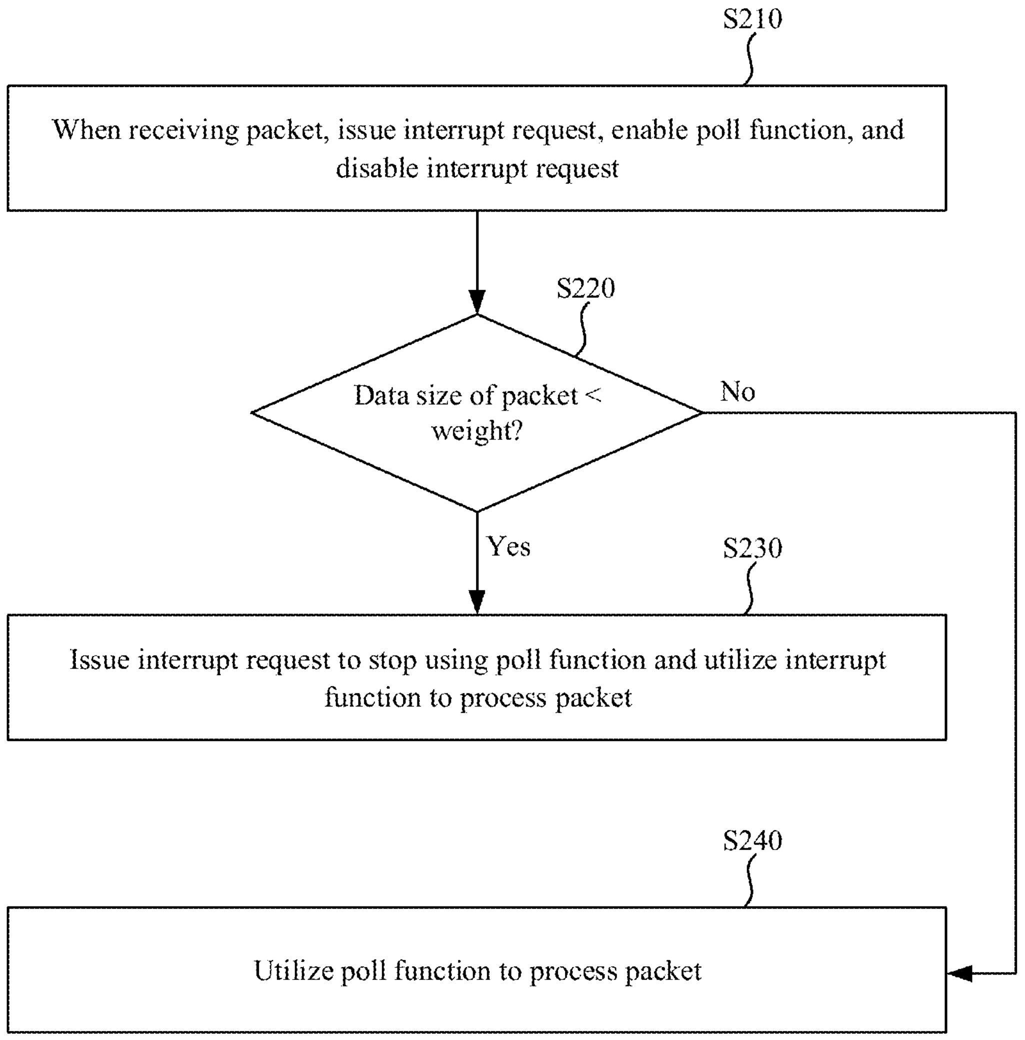
FIG. 2 illustrates a flowchart of operations of the NIC driver in FIG. 1 processing the packet according to some embodiments of the present disclosure.

FIG. 2 illustrates a flowchart of operations of the NIC driver 112 in FIG. 1 processing the packet P1 according to some embodiments of the present disclosure. In operation S210, when a packet is received, an interrupt request is issued, the poll function is enabled, and the interrupt request is disabled. In operation S220, whether the data size of the packet is less than a weight is determined. If the data size of the packet is less than the weight, operation S230 is performed. Alternatively, if the data size of the packet is greater than or equal to the weight, operation S240 is performed. In operation S230, the interrupt request is issued to stop using the poll function and the interrupt function is utilized to process the packet. In operation S240, the poll function is utilized to process the packet.

In some embodiments, a weight W (as shown in FIG. 1) may be a predetermined value previously recorded by the NIC driver 112. In some embodiments, the weight W may be set based on network traffic. For example, the weight W may be set to, but is not limited to, 32 or 64. The NIC driver 112 may compare the weight W with the data size of the received packet P1 to select a corresponding one of the poll function or the interrupt function to process the packet P1. In greater detail, when the NIC circuit 120 receives the packet P1, the NIC circuit 120 issues the interrupt request, and enables the poll function during the corresponding interrupt process, then disables this interrupt request (i.e., operation S210). The NIC driver 112 may compare the weight W with the data size of the received packet P1 (i.e., operation S220). If the data size of the packet P1 is greater than or equal to the weight W, the NIC driver 112 may utilize the poll function to process the packet P1 (i.e., operation S240). Alternatively, if the data size of the packet P1 is less than the weight W, the NIC driver 112 may issue an interrupt request to stop the poll function and switch to utilize the interrupt function to process the packet P1 (i.e., operation S230).

By the aforementioned setting, when the packet P1 is a packet with a large data size, the NIC driver 112 may utilize the poll function to process the packet P1. On the other hand, when the packet P1 is a packet with a small data size, the NIC driver 112 may utilize the interrupt function to process the packet P1. In other words, depending on the data size of the packet P1 to be processed, the NIC driver 112 may utilize the appropriate packet processing method, thereby avoiding excessive occupation of the processing time of the CPU circuit 110 and improving packet processing efficiency.

Figure 3A:
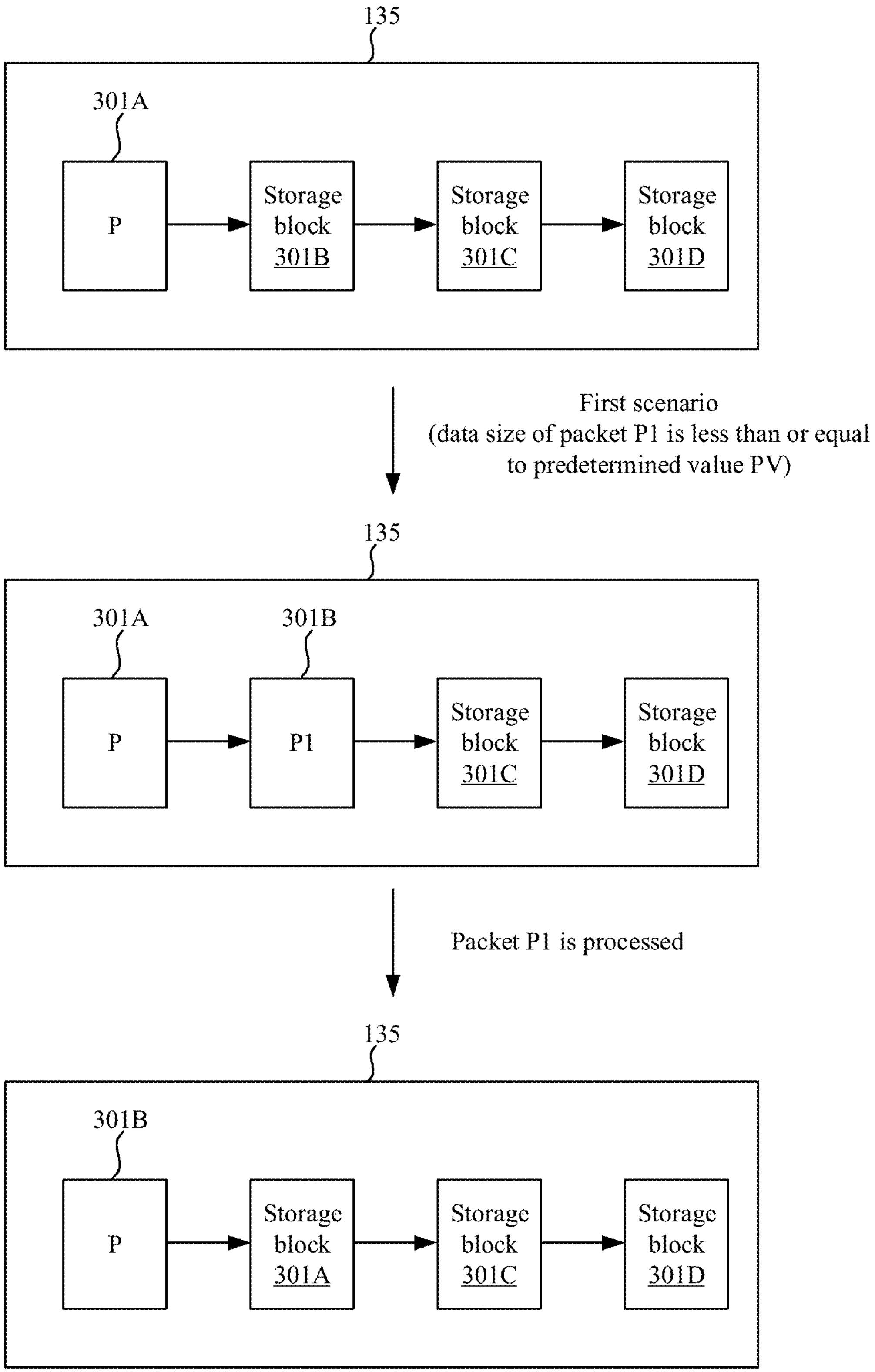
FIG. 3A illustrates a schematic diagram of operations of the storage pool in FIG. 1 under a first scenario according to some embodiments of the present disclosure.
Figure 3B:
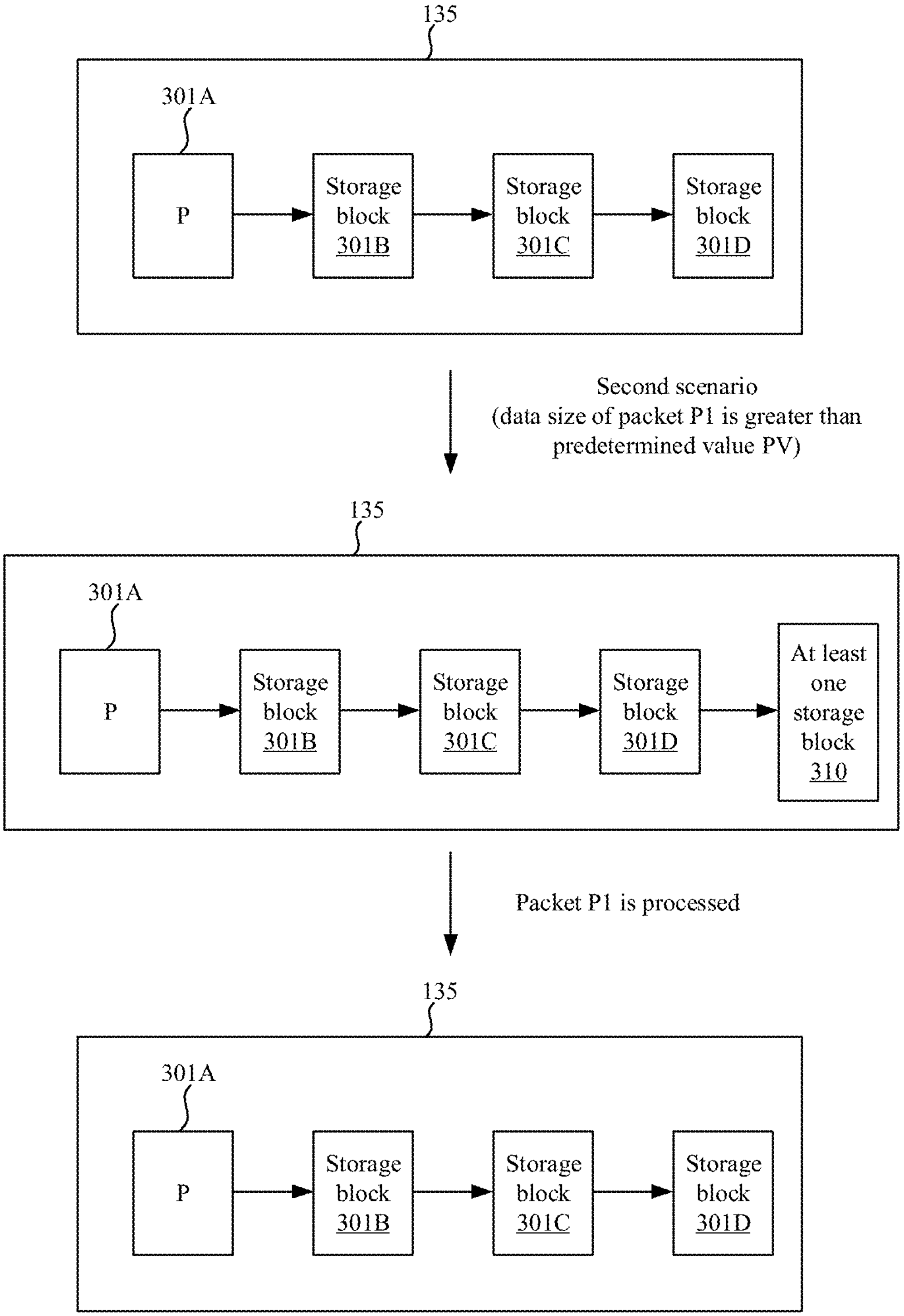
FIG. 3B illustrates a schematic diagram of operations of the storage pool in FIG. 1 under a second scenario according to some embodiments of the present disclosure.

For ease of understanding and illustration, an example where the network device 100 processing of the packet P1 in the loopback mode is given with reference to FIG. 3A to FIG. 3B, but the present disclosure is not limited thereto.

FIG. 3A illustrates a schematic diagram of operations of the storage pool 135 in FIG. 1 under a first scenario according to some embodiments of the present disclosure. In some embodiments, when the NIC driver 112 utilizes the poll function and/or the interrupt function to process the packet P1, the NIC driver 112 may temporarily store the packet P1 in at least one storage block of the storage pool 135, and release the at least one storage block back to the storage pool 135 after completing the processing of the packet P1. In some embodiments, before the network device 100 is going to transmit the processed packet P1', the NIC circuit 120 issues an interrupt request, and the NIC driver 112 may release the aforementioned at least one storage block in response to the interrupt request. In other words, the operations shown in FIG. 3A may be considered as at least one specific step in the operations S230 and/or S240 in FIG. 2. For example, when performing the poll function, the NIC driver 112 may store descriptors of the packet P1 in the at least one storage block of the storage pool 135, thereby parsing the descriptors in the at least one storage block. After parsing all the descriptors in the packet P1, the NIC driver 112 may utilize a free function (a function for releasing space) to release the at least one storage block back to the storage pool 135.

In some embodiments, before starting to receive packets, the NIC driver 112 may request storage space(s) in the memory circuit 130 from the kernel 116 to configure this storage space as the storage pool 135. For example, the NIC driver 112 may utilize a malloc function (which is a memory allocation function) to request the kernel 116 to allocate a portion of storage space in the memory circuit 130 as the storage pool 135. As shown in FIG. 3A, the storage pool 135 includes storage blocks 301A to 301D, which are configured based on a chain table structure. The storage block 301A is the first storage block in the storage pool 135 and may store a header P. In some embodiments, the header P may indicate information related to the storage pool 135, such as the starting address of the chain table, the length of the chain table (i.e., the number of the storage blocks 301A to 301D), and the number of storage blocks in the storage blocks 301A to 301D that do not store data. In some embodiments, each of the storage blocks 301A to 301D has the same predetermined data capacity, which may be, but is not limited to, 1600 bytes.

In some embodiments, the NIC driver 112 may compare the data size of the received packet P1 with a predetermined value PV (as shown in FIG. 1). When the data size of the packet P1 is less than or equal to the predetermined value PV (i.e., the first scenario shown in FIG. 3A), the NIC driver 112 may store the packet P1 in one of the storage blocks 301A to 301D. In some embodiments, the predetermined value PV may be determined be based on the aforementioned predetermined data capacity and may be a predetermined value previously recorded by the NIC driver 112. For example, the predetermined value PV may be set to a value equal to the aforementioned predetermined data capacity. Thus, when the data size of the packet P1 is less than or equal to the predetermined value PV, it indicates that the storage space of any one of the storage blocks 301A to 301D is sufficient to store the packet P1. Under this condition, the NIC driver 112 may store the packet P1 in one of the storage blocks 301A to 301D (for example, storage block 301B) for processing the packet P1. Then, after the NIC driver 112 has finished processing the packet P1, the NIC driver 112 may release the storage block 301B to the storage pool 135 (instead of to the kernel 116).

For example, as shown in FIG. 3A, after the packet P1 is processed, the NIC driver 112 may release the storage block 301B to the storage pool 135. The storage block 301B may be set as the first storage block of the storage pool 135 (i.e., updated to be a first one of storage blocks in the chain table). Under this condition, the header P1 stored in the storage block 301A will be transferred and stored in the storage block 301B.

FIG. 3B illustrates a schematic diagram of operations of the storage pool 135 in FIG. 1 under a second scenario according to some embodiments of the present disclosure. Unlike the first scenario in FIG. 3A, in FIG. 3B, when the data size of the packet P1 is greater than the predetermined value PV (i.e., the second scenario shown in FIG. 3B), it indicates that the storage space of any one of the storage blocks 301A to 301D may be insufficient to store the packet P1. Under this condition, the NIC driver 112 may utilize the aforementioned malloc function to request additional space in the memory circuit 130 from the kernel 116 (for example, at least one storage block 310), to increase the storage capacity of the storage pool 135, in order to store the packet P1 in the storage pool 135. For example, the NIC driver 112 may sequentially store the data of the packet P1 in the storage blocks 301B to 301D. After obtaining at least one storage block 310, the NIC driver 112 may transfer the packet P1 from the storage blocks 301B to 301D to the at least one storage block 310. In other words, when the data size of the packet P1 is larger, the NIC driver 112 may request the kernel 116 for more storage blocks in the memory circuit 130, in order to ensure that the data capacity of at least one storage block (i.e., at least one storage block 310) in the storage pool 135 is sufficient to store the packet P1. Then, after the NIC driver 112 has processed the packet P1, the NIC driver 112 may release the at least one storage block 310 to the kernel 116. Under this condition, the number of the storage blocks 301A to 301D in the storage pool 135 may remain unchanged.

Figure 3C:
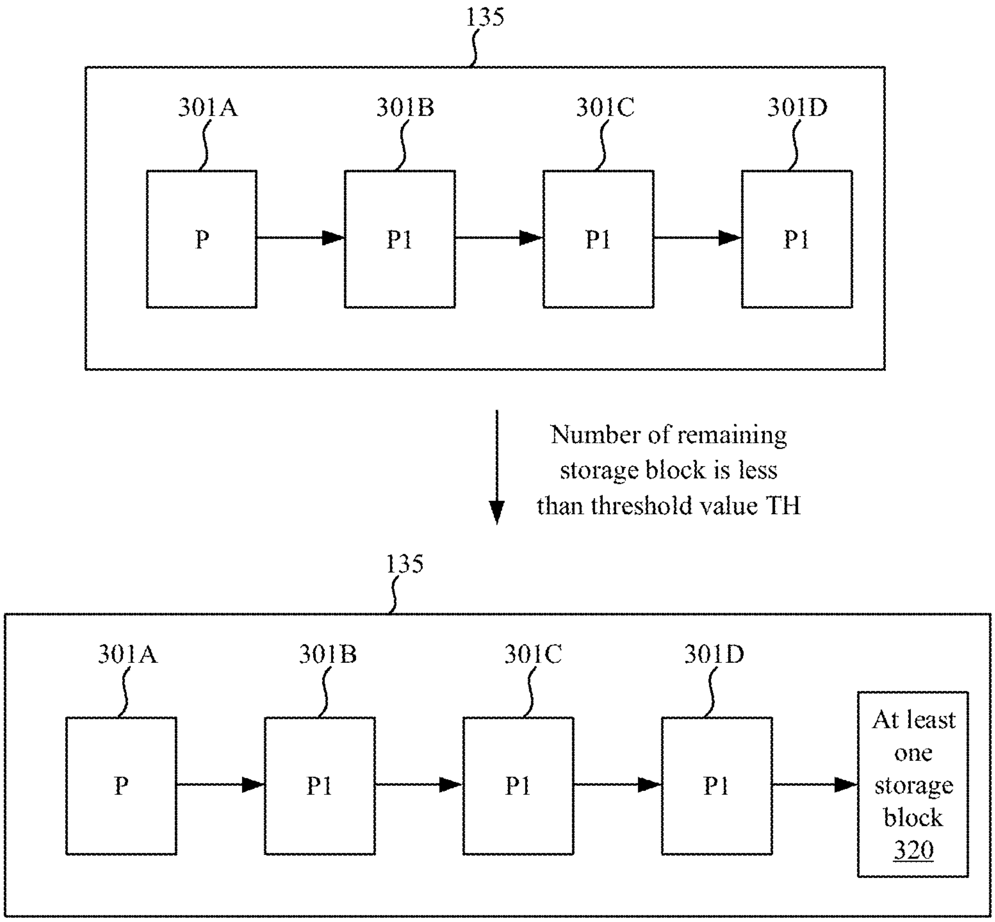
FIG. 3C illustrates a schematic diagram of operations of the storage pool in FIG. 1 according to some embodiments of the present disclosure.

FIG. 3C illustrates a schematic diagram of operations of the storage pool 135 in FIG. 1 according to some embodiments of the present disclosure. In the processes in FIG. 3A and/or FIG. 3B, the storage pool 135 within the memory circuit 130 may selectively request additional storage space from the kernel 116 based on the information in the header P and a threshold value TH (as shown in FIG. 1), to increase the number of storage blocks in the storage pool 135. For example, the threshold value TH may be a predetermined value previously recorded by the storage pool 135. As shown in FIG. 3C, it is assumed that the threshold value TH is set to 2, and the storage blocks 301B, 301C, and 301D have already stored the packet P1. In other words, in the storage pool 135, the only remaining storage block that does not store data is the storage block 301A, and the number of the remaining storage blocks is 1. The storage pool 135 may determine the number of remaining storage blocks based on the information in the header P and compare this number with the threshold value TH. As the number of remaining storage blocks is less than the threshold value TH, the storage pool 135 may utilize the malloc function, through the NIC driver 112, to request additional storage blocks from the kernel 116 in the memory circuit 130 (for example, at least one storage block 320), thereby increasing the number of available storage blocks in the storage pool 135. Thus, the storage pool 135 may have a certain number of available storage blocks (which is equal to or greater than the threshold value TH) before processing the next packet, in order to maintain packet processing efficiency.

Values mentioned in FIGS. 3A, 3B, and 3C (e.g., the predetermined value PV, threshold value TH, and the number of storage blocks in each figure) are given for illustrative purposes, and the present disclosure is not limited thereto.

Figure 4:
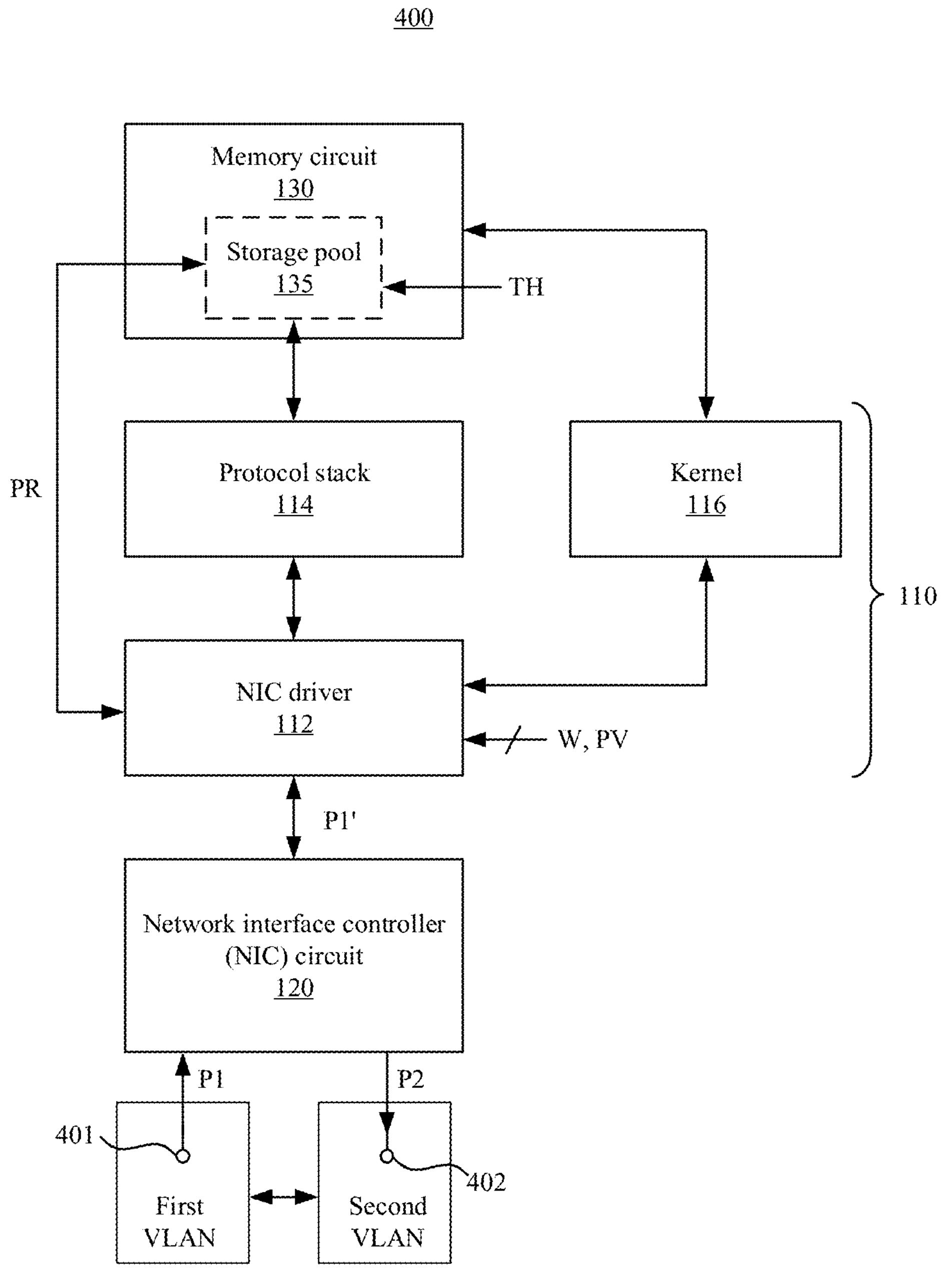
FIG. 4 illustrates a schematic diagram of a network device according to some embodiments of the present disclosure.

FIG. 4 illustrates a schematic diagram of a network device 400 according to some embodiments of the present disclosure. In this example, the NIC circuit 120 is configured to operate as a one-armed router, allowing the network device 400 to configure sub-ports to connect to different virtual local area networks (VLANs). For example, a port 401 belongs to the first VLAN, and a port 402 belongs to the second VLAN, where the first VLAN and the second VLAN may be interconnected and communicate through the network device 400. In some embodiments, the network device 400 (and/or the NIC circuit 120) has the functionality of a layer 3 switch.

Under this condition, the NIC driver 112 may add constant data PR to the packet P1 (for example, coming from the port 401) when receiving the packet P1. For example, in the process of processing the packet P1, based on a Linux-based network data structure, the NIC driver 112 may add the constant data PR to the data structure of the packet P1 (for example, to the data field cb in the data structure skb) when reading the packet P1 from the original storage blocks in the storage pool 135 (e.g., the storage blocks 301A to 301D shown in FIG. 3A). Then, when The NIC driver 112 transmits the packet, the NIC driver 112 may determine whether this packet contains the constant data PR. If the packet includes the constant data PR, it indicates that this packet was read out from the storage pool 135 (for example, the packet P1). Under this condition, the NIC driver 112 may release the storage block (for example, the storage block 301B in FIG. 3A) previously utilized to store the packet P1 back to the storage pool 135. Alternatively, if the packet to be transmitted does not include the constant data PR, it indicates that this packet was not read out from the original storage blocks of the storage pool 135. In this case, the NIC driver 112 may release the storage space previously utilized to store this packet back to the kernel 116 after transmitting the packet. In some embodiments, in the example of FIG. 4, the NIC driver 112 provides the packet P1 to the protocol stack 114 for processing.

Figure 5:
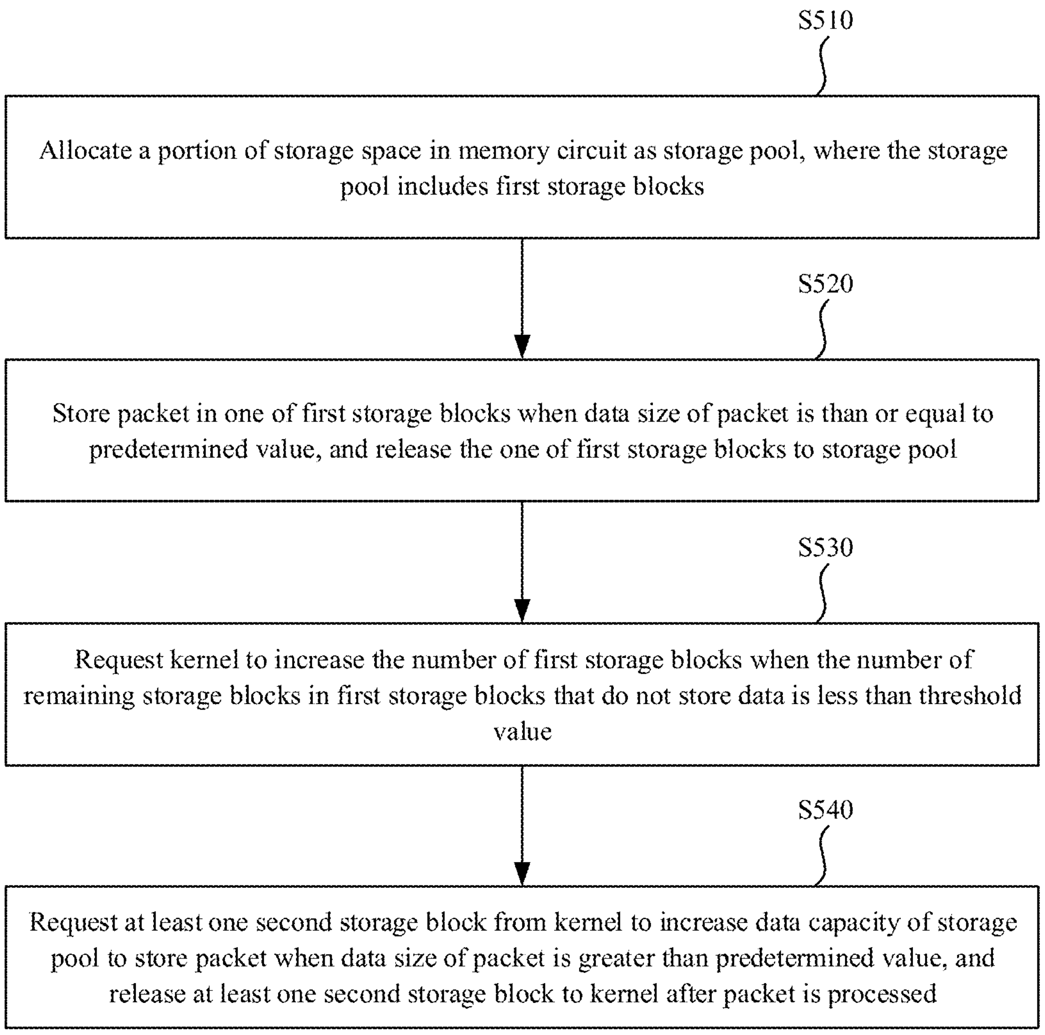
FIG. 5 illustrates a flowchart of a packet processing method according to some embodiments of the present disclosure.

FIG. 5 illustrates a flowchart of a packet processing method 500 according to some embodiments of the present disclosure. In operation S510, a portion of storage space in a memory circuit is allocated as a storage pool, where the storage pool includes first storage blocks. In operation S520, when the data size of a packet is than or equal to a predetermined value, the packet is stored in one of the first storage blocks, and after the packet is processed, the one of the first storage blocks is released to the storage pool. In operation S530, when the number of remaining storage blocks in the first storage blocks that do not store data is less than a threshold value, a kernel is requested to increase the number of the first storage blocks. In operation S540, when the data size of the packet is greater than the predetermined value, at least one second storage block is requested from the kernel to increase the data capacity of the storage pool to store the packet, and after the packet is processed, the at least one second storage block is released to the kernel.

Operations in the packet processing method 500 can be understood with reference to descriptions of above embodiments, and thus repetitious descriptions are not further given herein. The above description of operations of the packet processing method 500 includes exemplary operations, but the operations are not necessarily performed in the order described above. Operations of the packet processing method 500 may be added, replaced, changed order, and/or eliminated, or may be performed simultaneously or partially simultaneously as appropriate, in accordance with the spirit and scope of various embodiments of the present disclosure. For example, operation S530 may be performed simultaneously or partially simultaneously with operation S520 and/or S540.

As described above, the packet processing method and the network device provided by some embodiments of the present disclosure are able to select an appropriate processing method from multiple packet processing options according to the data size of the packet and configure a storage pool, which may be dynamically managed, to assist in accelerating packet processing. As a result, the overall efficiency of sending and receiving packets can be enhanced.

Various functional components or blocks have been described herein. As will be appreciated by persons skilled in the art, in some embodiments, the functional blocks will preferably be implemented through circuits (either dedicated circuits, or general-purpose circuits, which operate under the control of one or more processors and coded commands), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A packet processing method, comprising:

allocating a portion of storage space in a memory circuit as a storage pool, wherein the storage pool comprise a plurality of first storage blocks;

storing a packet in one of the plurality of first storage blocks when a data size of the packet is less than or equal to a predetermined value, and releasing the one of the plurality of the first storage blocks to the storage pool after the packet is processed;

requesting an increase in a number of the plurality of first storage blocks from a kernel when a number of remaining storage blocks in the plurality of first storage blocks that do not store data is less than a threshold value; and requesting at least one second storage block from the kernel to increase a data capacity of the storage pool to store the packet when the data size of the packet is greater than the predetermined value, and releasing the at least one second storage block to the kernel after the packet is processed.

2. The packet processing method of claim 1, wherein the storage pool is configured based on a chain table structure.

3. The packet processing method of claim 1, wherein a first one of the plurality of first storage blocks is configured to store a header, and the header is configured to indicate the number of the plurality of first storage blocks and the number of the remaining storage blocks that do not store data.

4. The packet processing method of claim 1, further comprising:

comparing the data size of the packet with a weight;

utilizing an interrupt function to process the packet when the data size of the packet is less than the weight; and utilizing a poll function to process the packet when the data size of the packet is greater than or equal to the weight.

5. The packet processing method of claim 1, further comprising:

adding constant data to the packet when reading the packet out from the one of the plurality of the first storage blocks;

determining whether the packet comprises the constant data when transmitting the packet; and if the packet comprises the constant data, releasing the one of the plurality of the first storage blocks to the storage pool after the packet is transmitted.

6. The packet processing method of claim 5, further comprising:

if the packet does not comprise the constant data, releasing the at least one second storage block to the kernel after the packet is transmitted.

7. The packet processing method of claim 5, wherein the packet is received by a network interface controller circuit, and the network interface controller circuit operates as a one-armed router.

8. The packet processing method of claim 1, wherein the packet is received by a network interface controller circuit in a loopback mode.

9. The packet processing method of claim 1, wherein the predetermined value is equal to a predetermined data capacity of each of the plurality of first storage blocks.

10. The packet processing method of claim 1, wherein requesting the at least one second storage block from the kernel to increase the data capacity of the storage pool to store the packet when the data size of the packet is greater than the predetermined value, and releasing the at least one second storage block to the kernel after the packet is processed comprises:

updating the one of the plurality of first storage blocks to be a first one of the plurality of first storage blocks; and storing, by the first one of the plurality of first storage blocks, a header related to the storage pool.

11. A network device, comprising:

a network interface controller circuit configured to receive a packet;

a central processing unit circuit configured to execute a kernel and a network interface controller driver; and a memory circuit electrically coupled to the central processing unit circuit, wherein a portion of storage space of the memory circuit is allocated as a storage pool that comprises a plurality of first storage blocks, and the storage pool is configured to request an increase in a number of the plurality of first storage blocks from the kernel when a number of remaining storage blocks in the plurality of first storage blocks that do not store data is less than a threshold value, wherein the network interface controller driver is configured to:

store the packet in one of the plurality of first storage blocks when a data size of the packet is less than or equal to a predetermined value, and release the one of the plurality of the first storage blocks to the storage pool after the packet is processed; and request at least one second storage block from the kernel to increase a data capacity of the storage pool to store the packet when the data size of the packet is greater than the predetermined value, and release the at least one second storage block to the kernel after the packet is processed.

12. The network device of claim 11, wherein the storage pool is configured based on a chain table structure.

13. The network device of claim 11, wherein a first one of the plurality of first storage blocks is configured to store a header, and the header is configured to indicate the number of the plurality of first storage blocks and the number of the remaining storage blocks that do not store data.

14. The network device of claim 11, wherein the network interface controller driver is further configured to update the one of the plurality of first storage blocks to be a first one of the plurality of first storage blocks, and store a header related to the storage pool in the first one of the plurality of first storage blocks.

15. The network device of claim 11, wherein the network interface controller driver is further configured to:

compare the data size of the packet with a weight;

utilize an interrupt function to process the packet when the data size of the packet is less than the weight; and utilize a poll function to process the packet when the data size of the packet is greater than or equal to the weight.

16. The network device of claim 11, wherein the network interface controller driver is further configured to:

add constant data to the packet when receiving the packet:

determine whether the packet comprises the constant data when transmitting the packet; and release the one of the plurality of the first storage blocks to the storage pool after the packet is transmitted if the packet comprises the constant data.

17. The network device of claim 16, wherein the network interface controller driver is further configured to release the at least one second storage block to the kernel after the packet is transmitted if the packet does not comprise the constant data.

18. The network device of claim 16, wherein the network interface controller circuit operates as a one-armed router.

19. The network device of claim 11, wherein the packet is received by the network interface controller circuit in a loopback mode.

20. The network device of claim 11, wherein the predetermined value is equal to a predetermined data capacity of each of the plurality of first storage blocks.

* * * * *